US010302072B2

(12) United States Patent
Wagner et al.

(10) Patent No.: US 10,302,072 B2
(45) Date of Patent: May 28, 2019

(54) METHOD FOR MANUFACTURING A SPHERICAL-CAP-SHAPED RECESS IN A DRIVE SHAFT, DRIVE SHAFT COMPRISING THE RECESS, AND HYDROSTATIC AXIAL PISTON MACHINE COMPRISING THE DRIVE SHAFT

(71) Applicant: Robert Bosch GmbH, Stuttgart (DE)

(72) Inventors: Martin Wagner, Neu-Ulm (DE); Dennis Haege, Oellingen (DE)

(73) Assignee: Robert Bosch GmbH, Stuttgart (DE)

( * ) Notice: Subject to any disclaimer, the term of this patent is extended or adjusted under 35 U.S.C. 154(b) by 308 days.

(21) Appl. No.: 15/349,913

(22) Filed: Nov. 11, 2016

(65) Prior Publication Data
US 2017/0138355 A1    May 18, 2017

(30) Foreign Application Priority Data
Nov. 13, 2015  (DE) ........................ 10 2015 222 386

(51) Int. Cl.
*C21D 1/06*    (2006.01)
*F04B 1/12*    (2006.01)
*C21D 9/28*    (2006.01)
*F01B 3/00*    (2006.01)
*F16C 3/02*    (2006.01)

(52) U.S. Cl.
CPC ................ *F04B 1/128* (2013.01); *C21D 1/06* (2013.01); *C21D 9/28* (2013.01); *F01B 3/0032* (2013.01); *F01B 3/0038* (2013.01); *F01B 3/0085* (2013.01); *F01B 3/0094* (2013.01); *F16C 3/02* (2013.01)

(58) Field of Classification Search
CPC .......... F04B 1/128; F16C 3/02; F01B 3/0094; C21D 9/28; C21D 1/06
See application file for complete search history.

(56) References Cited

FOREIGN PATENT DOCUMENTS

DE        2 102 461       8/1972
DE   10 2013 226 090 A1    6/2015

*Primary Examiner* — Jessee R Roe
(74) *Attorney, Agent, or Firm* — Maginot, Moore & Beck LLP

(57) ABSTRACT

A method for manufacturing an at least sectionally spherical-cap-shaped recess on a drive shaft for a hydrostatic axial piston machine includes whirling of the recess and heat treatment of the recess to form a wear layer. A drive shaft for a hydrostatic axial piston machine includes at least one recess manufactured according to the method. A hydrostatic axial piston machine includes a drive shaft with at least one recess manufactured according to the method.

7 Claims, 2 Drawing Sheets

_US 10,302,072 B2_

METHOD FOR MANUFACTURING A SPHERICAL-CAP-SHAPED RECESS IN A DRIVE SHAFT, DRIVE SHAFT COMPRISING THE RECESS, AND HYDROSTATIC AXIAL PISTON MACHINE COMPRISING THE DRIVE SHAFT

This application claims priority under 35 U.S.C. § 119 to patent application no. DE 10 2015 222 386.8, filed on Nov. 13, 2015 in Germany, the disclosure of which is incorporated herein by reference in its entirety.

BACKGROUND

The disclosure relates to a method for manufacturing a spherical-cap-shaped recess in a drive shaft, to a drive shaft comprising said recess, and to a hydrostatic axial piston machine comprising the drive shaft.

A hydrostatic axial piston machine has a drive shaft with a drive flange provided on the end face with a plurality of spherical-cap-shaped recesses arranged on a pitch circle. Ball heads of working pistons and a guide piston of a cylinder drum of the axial piston machine are received pivotably in said recesses. In this case, the working pistons plunge into cylinder bores of the cylinder drum and are received therein so as to be axially displaceable, in order to transmit torque to the drive shaft in motor operation, and alternatively in pump operation to convey pressure medium to the high-pressure side, in the event of a change in pressure and on account of the inclined position of the drive shaft in relation to the cylinder drum.

To ensure that the axial piston machine is operated as intended, the spherical-cap-shaped recesses, just like the ball heads, have to satisfy specifications with respect to their dimensional tolerance, in particular the circularity, and their wear behavior.

For manufacturing, methods are known in which the recesses are shaped by cutting by means of whirling and subsequently provided with a hard wear layer by means of a heat treatment, in particular by means of gas nitrocarburizing (GNC). Corresponding gas nitrocarburizing is proposed for cylinder bores of a cylinder drum in the document DE 10 2013 226 090 A1.

The methods known to date have the disadvantage that the wear layer which is formed during the GNC is relatively brittle, non-uniform and thick, and therefore it has to be reworked. In order to satisfy the tolerances and to avoid sections of the wear layer breaking away during operation, the latter therefore customarily has to be ground in a third method step and then finished. In this way, firstly the thickness of the wear layer is reduced in such a manner that the required tolerance in relation to the circularity of the recess is observed, and secondly the susceptibility to brittle fracture is reduced. Finishing for spherical outer surfaces is disclosed, for example, in the laid-open specification DE 2 102 461. A disadvantage of this is the fact that the finishing step is costly and time-consuming.

In this respect, the disclosure is based on the object of providing a less costly and/or time-consuming method for manufacturing the spherical-cap-shaped recess. Furthermore, the disclosure is based on the object of providing a drive shaft comprising such a recess and a hydrostatic axial piston machine comprising such a drive shaft.

SUMMARY

The first object is achieved by a method having the features of the disclosure, the second object is achieved by a drive shaft having the features of the disclosure, and the third object is achieved by a hydrostatic axial piston machine having the features of the disclosure.

Advantageous developments of the method and the drive shaft are described in the dependent claims.

A method for manufacturing an at least sectionally spherical-cap-shaped recess on a drive shaft comprises the steps of "manufacturing the recess by whirling" and "heat treatment of the recess to form a wear layer, in particular on an inner lateral surface of the recess". In particular, the drive shaft is provided for use in a hydrostatic axial piston machine, and the recess is provided for receiving a ball head of a guide piston or working piston of the axial piston machine. According to the disclosure, specifications of the recess in relation to dimensional tolerance, in particular circularity, and wear behavior are satisfied with the step of "heat treatment". Therefore, after the step of "heat treatment", no further step, neither grinding nor finishing, is required in order to satisfy the required specifications. Compared to the prior art, this leads to a shortening of the process chain, a reduction in the manufacturing costs and to an increase in process reliability in manufacturing.

In an alternative method, the heat treatment of the recess is followed by a further step of "grinding of the wear layer", in which the specifications of the recess in relation to dimensional tolerance, in particular circularity, and wear behavior are then satisfied. Therefore, at least the step of finishing is dispensed with. On account of the fact that there is no need for the finishing, as compared with the prior art, this method variant, too, leads to a shortening of the process chain and to a reduction in the manufacturing costs and to an increase in process reliability in manufacturing. The applicant reserves the right to direct an independent patent claim or a patent application to this method variant.

For both methods, it is possible to identify the omission of the finishing from the microsection of the wear layer, since the surface thereof then has a substantially parallel microsection rather than the cross-shaped microsection typical of the finishing.

A comparatively thick base layer, in particular a diffusion layer, is formed beneath the wear layer in the available material of the recess (after the whirling) by way of the step of "heat treatment". Said base layer has a supporting effect on the wear layer arranged thereabove.

In the direction of the inner lateral surface of the recess, this is followed by a first layer of the wear layer, which is formed by way of the step of "heat treatment" and is referred to in particular as a connecting layer.

The connecting layer preferably has a total thickness of approximately 6-8 μm. A tolerance of this connecting layer in this respect lies approximately between 5 and 11 μm.

Here, the connecting layer is divided into two sections. A first section is formed within the material of the recess available for the heat treatment, and has a thickness of approximately 3-5 μm. A second section arranged thereabove has a thickness of approximately 3-5 μm. The latter section has therefore additionally been built up on the material available for the recess by way of the "heat treatment".

In one development, the first layer is formed during the step of "heat treatment" with monitoring by a sensor. In this case, a sensor continuously senses the total thickness of the second layer and terminates the heat treatment when the desired value is reached.

Right at the top, in one development, the wear layer has a second layer, in particular an oxide layer, which has a thickness of approximately 2 µm. This is preferably applied with a step of "evaporation with water vapor" following the "heat treatment".

In one development, a nitriding hardness depth of the wear layer given a hardness of approximately 550 bHV10 is greater than 0.15 mm, in particular approximately 0.17 mm.

The following developments are also applicable to both of the methods mentioned.

The step of "whirling" is preferably preceded by a step of "pre-manufacturing of the recess by cutting by drilling and/or milling or the like".

The steps of "pre-manufacturing by cutting" and "whirling" are preferably effected on the same machine tool, and this keeps retrofitting costs low.

To increase its manufacturing accuracy, said machine preferably has axis synchronization, in particular 5-axis synchronization. As a result, geometry errors of the machine, in particular axis errors, can be compensated for.

In one development, the machine has temperature compensation in order to compensate for its geometry errors based on a change in temperature. This, too, leads to an improved and reproducible quality of the recess.

In one development of the method, a step of "visual and/or tactile measuring of the recess" is effected before and/or after the heat treatment.

In one development of the method, the quality of the recess is further increased by carrying out the steps of "evaluating of the visual and/or tactile measurement results for one or more recesses", in particular with respect to dimensional stability and circularity, and "correcting of a machine setting depending on the evaluation".

In one development of the method, to satisfy the specifications in relation to the wear behavior, in particular specifications of the wear layer with respect to its thickness, its surface hardness and its ductility are satisfied, these having a significant influence on the stability of the wear layer. In the first method, these specifications are satisfied with the step of heat treatment, and in the second method with the step of grinding.

The aforementioned specifications are in this case oriented in particular to an intended operation of the axial piston machine, in particular to its operating parameters of rotational speed and working pressure, and thus serve to protect against damage to or failure of the machine.

In one development, the step of "manufacturing of the recess by whirling" is effected with air cooling. In this way, firstly a service life of the whirling tool can be increased and secondly a standard deviation of the shape, in particular of the circularity, can be reduced.

In one development, the step of "heat treatment" is effected in a plurality of stages. Each of these stages has a differing temperature and duration.

By way of example, two-stage or three-stage methods are conceivable here.

In one development, a first of the stages has a lower temperature and longer duration than the subsequent second of the stages. From the second stage, a high quantity of carbon compared to the first stage is preferably added given the then high temperature and short duration. In the three-stage method, the second of the stages preferably has a lower temperature and longer duration than the subsequent third of the stages.

The step of "heat treatment" preferably comprises gas nitrocarburizing (GNC).

A specified surface hardness of the wear layer is preferably greater than approximately 1000 HV10.

In one development, a step of "cleaning of the recess" is effected after the step of "heat treatment" or after the step of "grinding" or even later.

A drive shaft for a hydrostatic axial piston machine in particular configured with an oblique axis design has, on the end face, at least one recess manufactured by a method according to the preceding description.

In this respect, the recess is preferably arranged on the end face of a flange of the drive shaft.

In a preferred development, the drive shaft has a multiplicity of such recesses arranged on a pitch circle. The pitch circle extends in this case concentrically with respect to the axis of rotation of the drive shaft.

A hydrostatic axial piston machine, in particular of oblique axis design, has such a drive shaft. In this case, a ball head of a guide piston or working piston of a cylinder drum of the axial piston machine is preferably received in each case in the one recess or in the plurality of recesses. The working pistons and/or the guide piston are received in cylinder bores provided therefor in the cylinder drum in an axially displaceable manner. In pump operation of the axial piston machine, torque can thus be transmitted from the drive shaft to the cylinder drum via the ball heads received in the recesses. The positioning of the axes of rotation of the cylinder drums in relation to the drive shaft then brings about an alternating retraction and extension of the working pistons, as a result of which pressure medium is pumped from the low-pressure side to the high-pressure side of the axial piston machine. Conversely, the coupling of the recesses with the ball heads makes it possible, in motor operation, for a torque to be transmitted from the ball heads to the drive shaft.

BRIEF DESCRIPTION OF THE DRAWINGS

An exemplary embodiment of an axial piston machine according to the disclosure and of a method according to the disclosure are shown in the drawings. The disclosure will now be explained in more detail with reference to the figures in these drawings, in which.

DETAILED DESCRIPTION

Figure 1:
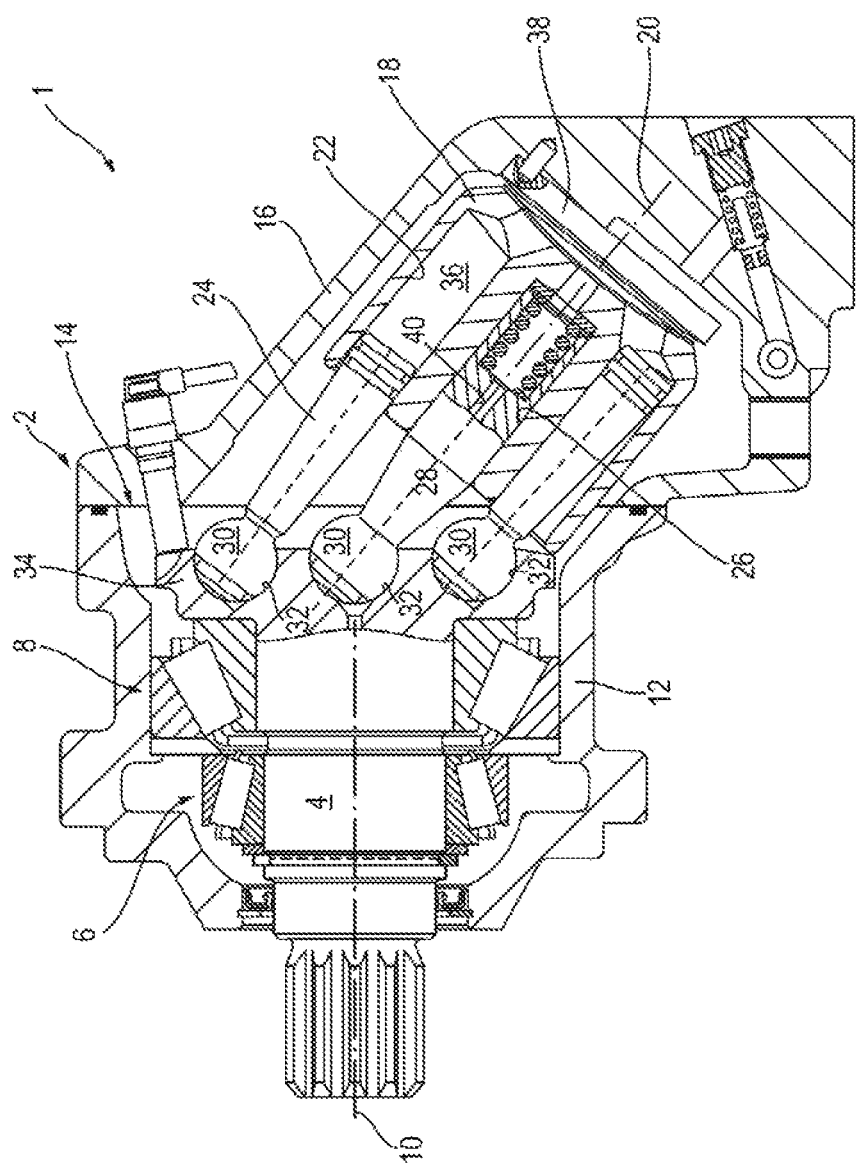
FIG. 1 shows, in a longitudinal section, an axial piston machine according to the disclosure of oblique axis design.

As shown in FIG. 1, an axial piston machine 1 configured with an oblique axis design has a two-part housing 2, in which a drive shaft 4 is mounted by way of two tapered-roller bearings 6 and 8, rotatable about an axis of rotation 10. The exemplary embodiment of the axial piston machine 1 as shown in FIG. 1 is configured as a constant-displacement machine, i.e. with a constant displacement volume, and can alternatively be configured with a variable displacement volume.

The drive shaft 4 is received by way of the bearings 6, 8 in a first housing part 12 with a pot-like shape. A second housing part 16 angled in relation to the first housing part 12 is positioned at the opening 14 of said first housing part, by way of which the drive shaft 4 is mountable, with a cylinder drum 18 being mounted in said second housing part in a manner rotatable about an axis of rotation 20. In this case, the cylinder drum 18 has a plurality of cylinder bores 22, which are arranged on a pitch circle arranged concentrically with respect to the axis of rotation 20 and in each of which there is arranged a working piston 24 in an axially displaceable manner. Coaxially with respect to the axis of rotation 20, the cylinder drum 18 has a central cylinder bore 26, in which a guide or centering piston 28 of the cylinder drum 18 is received slidingly.

The guide piston 28 and the working pistons 24 each have a ball head 30, which is formed in a respective spherical-cap-shaped recess 32 of a drive shaft flange 34 which is located on the end face of the drive shaft 4 and is arranged close to the opening 14. The non-rotatable connection between the drive shaft 4 and the cylinder drum 18 is realized via the ball heads 30 received in the recesses 32 and the working pistons 24.

The second housing part 16 has a low-pressure connection and a high-pressure connection (neither shown), by way of which hydrostatic working spaces 36 delimited by the working pistons 24 and the cylinder bores 22 thereof are each alternatively fluidically connectable to low pressure and high pressure. The fluidic connection is reversed in this case by way of a control disk 38, arranged immovably in the second housing part 16, and kidney-shaped pressure ports formed therein (not shown).

Each ball head 30 is hydrostatically relieved in the recess 32. This is achieved by virtue of the fact that the respective piston 24, 28 has a centric through-recess 40 (only shown for the centering piston 28), by way of which a gap formed in each case between the ball head 30 and the recess 32 is supplied with hydrostatic pressure medium from an inner space of the cylinder drum 18 assigned to the respective piston 24, 28—for the working pistons 24, these are the working spaces 36.

During intended operation of the axial piston machine 1, which for example has a working pressure of up to 500 bar and a rotational speed of the drive shaft 4 of up to 5000 l/min, the frictional pairing of the ball head 30 with the spherical-cap-shaped recess 32 is exposed to high levels of loading. It is therefore necessary to observe narrow tolerances in relation to the shape of the ball head 30 and of the recess 32, in particular with respect to their respective circularity, and a correspondingly hard but nevertheless ductile surface of the two friction partners 30, 32.

As shown in FIG. 1, the ball heads 30 each have an annular shoulder 31, which extends in a radially extensive manner with respect to a piston longitudinal axis and by way of which the pressure medium arranged in the gap between the ball head 30 and the recess 32 and provided for the hydrostatic relief of said frictional pairing is effectively retained in the gap.

In the exemplary embodiment shown, this retention is improved yet further by virtue of the fact that the inner lateral surface of the respective recesses 32 additionally engages behind the respective ball head 30 beyond the equator thereof.

Figure 2:
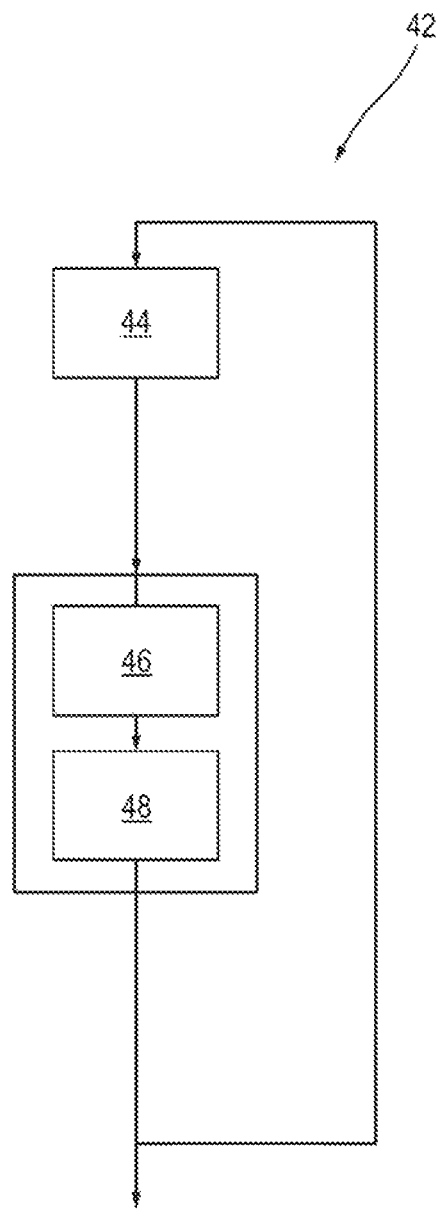
FIG. 2 shows a block diagram of a method according to the disclosure.

The aforementioned specifications are achieved in relation to the recesses 32 by way of the manufacturing method 42 according to the disclosure which is shown in FIG. 2. As shown in FIG. 2, said method comprises a step of whirling 44 of the recesses 32 on the drive shaft flange 34.

The accuracy of the whirling is achieved in this case to a deviation of the dimensional tolerance, in particular circularity, of less than or equal to 0.01 mm, in particular on account of the aforementioned aspects of "pre-manufacturing by cutting and whirling on the same machine tool" and "5-axis-synchronized machine with temperature compensation".

With this improved circularity after whirling as compared with the prior art, a further method step 46 involves a heat treatment of the whirled recess 32 by means of 3-stage gas nitrocarburizing (GNC).

The layers formed thereby are: right at the bottom, a comparatively thick base layer, also referred to as a diffusion layer. The actual wear layer has, following the latter in the direction of the inner lateral surface of the recess 32, a first layer, also referred to as a connecting layer. In the exemplary embodiment according to the disclosure, the latter has a thickness of approximately 6 to approximately 8 µm on account of the optimized heat treatment.

Compared with thicknesses of approximately 4 to approximately 15 µm which are known from conventional manufacturing methods with whirling and heat treatment, it is therefore formed in a more uniform manner and on average to be thinner. In addition, a higher ductility and therefore a reduced inclination toward brittle fracture are achieved.

In particular, the three properties of the connecting layer of the wear layer according to the disclosure which are mentioned last render said finishing to achieve the specifications of the wear layer superfluous.

According to the method according to the disclosure, said specifications are therefore already achieved after the step of "heat treatment", and therefore at least the aforementioned finishing is superfluous.

In addition, to increase the quality of the wear layer, a step of "grinding of the wear layer" can be effected after the step of "heat treatment" (not shown).

Finally, a step of "cleaning 48 of the wear layer" is effected in the exemplary embodiment shown.

The method is then repeated for every further necessary recess 32 on the drive flange 34.

What is disclosed is a method for manufacturing an at least sectionally spherical-cap-shaped recess on a drive shaft for a hydrostatic axial piston machine, said method comprising the steps of "whirling of the recess" and then "heat treatment of the recess to form a wear layer". In this case, parameters of the two method steps are optimized in such a manner that specifications of the recess and of the wear layer in relation to dimensional tolerance and wear behavior are already satisfied after the heat treatment—in particular without additional grinding and finishing.

What are furthermore disclosed are a drive shaft for the hydrostatic axial piston machine comprising recesses manufactured in such a manner, and a hydrostatic axial piston machine comprising said drive shaft.

LIST OF REFERENCE SIGNS

1 Axial piston machine
2 Housing
4 Drive shaft
6, 8 Tapered-roller bearing
10 Axis of rotation
12 First housing part
14 Opening
16 Second housing part
18 Cylinder drum
20 Axis of rotation
22 Cylinder bore
24 Working piston
26 Cylinder bore
28 Centering piston
30 Ball head
31 Annular shoulder 32 Recess
34 Drive flange
36 Hydrostatic working space
38 Control disk
40 Pressure medium duct
42 Method
44 Whirling
46 Heat treatment
48 Cleaning

What is claimed is:

1. A method for manufacturing an at least sectionally spherical-cap-shaped recess on a drive shaft for a hydrostatic axial piston machine, the recess configured to receive a ball head of a guide piston or working piston of the axial piston machine, the method comprising:
whirling of the recess; and
heat treatment of the recess to form a wear layer, the heat treatment satisfying specifications of the recess with respect to dimensional tolerance and wear behavior.

2. The method according to claim 1, wherein the heat treatment satisfies specifications of the wear layer with respect to thickness, surface hardness, and ductility.

3. The method according to claim 1, wherein the whirling of the recess is effected with air cooling.

4. The method according to claim 1, wherein the heat treatment is effected in a plurality of stages of differing temperatures and durations.

5. The method according to claim 1, wherein a nitriding hardness depth is approximately 0.1 mm to 0.25 mm.

6. The method according to claim 1, further comprising cleaning the heat-treated recess.

7. The method according to claim 1, wherein a nitriding hardness depth is approximately 0.15 mm.

* * * * *